(12) United States Patent
Dluzneski

(10) Patent No.: US 7,468,412 B2
(45) Date of Patent: Dec. 23, 2008

(54) METHOD AND COMPOSITION FOR THE SUPPRESSION OF BLOOM IN PEROXIDE CROSSLINKED POLYMERIC ARTICLES

(75) Inventor: Peter R. Dluzneski, Harleysville, PA (US)

(73) Assignee: GEO Specialty Chemicals, Inc., Lafayette, IN (US)

( * ) Notice: Subject to any disclaimer, the term of this patent is extended or adjusted under 35 U.S.C. 154(b) by 643 days.

(21) Appl. No.: 11/163,104

(22) Filed: Oct. 5, 2005

(65) Prior Publication Data

US 2007/0078208 A1 Apr. 5, 2007

(51) Int. Cl.
*C08K 5/06* (2006.01)
(52) U.S. Cl. .................. 524/366; 524/376; 524/378; 524/381; 524/386
(58) Field of Classification Search .......... 524/366, 524/376, 378, 381, 386
See application file for complete search history.

(56) References Cited

U.S. PATENT DOCUMENTS

| | | | |
|---|---|---|---|
| 4,180,490 A | 12/1979 | Maclean | |
| 4,268,637 A | 5/1981 | Weldy | |
| 4,397,992 A | 8/1983 | Johansson et al. | |
| 4,579,911 A | 4/1986 | D'Sodicky et al. | |
| 5,280,124 A | 1/1994 | Winter et al. | |
| 5,491,211 A | 2/1996 | Rieck et al. | |
| 5,844,029 A | 12/1998 | Prabhu et al. | |
| 5,977,219 A | 11/1999 | Ravichandran et al. | |
| 6,214,915 B1 | 4/2001 | Avakian et al. | |
| 6,380,285 B1 | 4/2002 | Wood et al. | |
| 6,508,847 B2 | 1/2003 | Wood et al. | |
| 6,843,935 B2 | 1/2005 | Dluzneski et al. | |
| 6,878,763 B2 | 4/2005 | Blease et al. | |

*Primary Examiner*—Edward J Cain
(74) *Attorney, Agent, or Firm*—Rankin, Hill & Clark LLP

(57) ABSTRACT

The present invention provides a method for the suppression of bloom in polymeric articles that are crosslinked using α,α'-bis(tert-butylperoxy) diisopropylbenzene, polymeric compositions comprising α,α'-bis(tert-butylperoxy) diisopropylbenzene that are non-blooming, agents for crosslinking polymers, and crosslinked polymeric articles formed in accordance with the method of the invention. Agents for crosslinking a polymeric composition according to the invention include a mixture of α,α'-bis(tert-butylperoxy) diisopropylbenzene and a nonionic compound having a hydrophobic group bonded to a polyethylene glycol chain via an ether linkage, wherein the hydrophobic group includes about 12 or more carbon atoms at least 8 of which are in the form of an alkyl chain, and wherein the polyethylene glycol chain includes about 20 or more ethylene oxide units.

21 Claims, No Drawings

METHOD AND COMPOSITION FOR THE SUPPRESSION OF BLOOM IN PEROXIDE CROSSLINKED POLYMERIC ARTICLES

BACKGROUND OF THE INVENTION

1. Field of Invention

The present invention relates to a method and a composition for the suppression of bloom in peroxide crosslinked polymeric articles and, more particularly, to the suppression of bloom in polymeric articles that are crosslinked using α,α'-bis(tert-butylperoxy) diisopropylbenzene.

2. Description of Related Art

The term "bloom" refers to a thin coating of an ingredient of a rubber or other thermosetting polymeric mixture that migrates to the surface of an article, usually within a few hours after crosslinking. Bloom is usually harmless, but it can impair the aesthetic appearance of crosslinked polymeric articles and can sometimes interfere with the ability to bond or adhere materials to the crosslinked polymeric articles.

One of the ingredients of polymeric compositions that is known to cause bloom is α,α'-bis(tert-butylperoxy) diisopropylbenzene, a mixture of the meta and para isomers of that is widely used as a crosslinking agent for a variety of polymers including, for example, ethylene propylene terpolymer rubber ("EPDM"). Like all organic peroxide crosslinking agents, α,α'-bis(tert-butylperoxy) diisopropylbenzene crosslinks polymers by decomposing at relatively high temperatures to generate free radicals, which form crosslinks between polymer strands via a hydrogen abstraction mechanism. The decomposition products of α,α'-bis(tert-butylperoxy) diisopropy-benzene include the meta and para isomers of diacetylbenzene, acetyl dimethylbenzyl alcohol and diisopropylol benzene, the latter of which is a solid at room temperature (~22.5° C.) and is believed to be a major constituent of bloom.

Bloom from the decomposition of α,α'-bis(tert-butylperoxy) diisopropylbenzene may not be noticeable, particularly when low concentrations of α,α'-bis(tert-butylperoxy) diisopropylbenzene are used, because the decomposition products do have some solubility in even the most non-polar polymer matrices. But at in many crosslinked polymeric articles, at least some of the decomposition products tend to slowly migrate to the surface of the crosslinked polymeric article and form bloom. Such bloom can have a varied appearance including "iridescent speckling" to "dusting" to "hair-like filaments" that appear to emerge from the surface of the crosslinked polymeric article. The "hair-like filaments" appear because the blooming decomposition products form crystals when they reach the surface of the crosslinked polymeric part. In many cases, these crystals are oriented substantially perpendicular to the surface of the crosslinked polymeric article, which makes their presence particularly conspicuous. Bloom from the decomposition of α,α'-bis(tert-butylperoxy) diisopropylbenzene usually becomes evident on the surface of a crosslinked polymeric article several hours after vulcanization or curing, although in some cases it may take several weeks to become noticeable.

As previously noted, bloom is not desirable, if only for aesthetic reasons. In some cases, however, it may interfere with bonding between two crosslinked polymeric articles since the bloom may form a barrier that inhibits adhesion between the two articles. Bloom is conventionally removed from crosslinked polymeric articles by water washing. This solution, which adds a processing step and creates a nuisance waste stream, is often a temporary solution inasmuch as the bloom reappears over time.

BRIEF SUMMARY OF THE INVENTION

The present invention provides a method for the suppression of bloom in polymeric articles that are crosslinked using α,α'-bis(tert-butylperoxy) diisopropylbenzene, polymeric compositions comprising α,α'-bis(tert-butylperoxy) diisopropylbenzene that are non-blooming, and crosslinked polymeric articles formed in accordance with the method and polymeric compositions of the invention. Polymeric compositions according to the invention comprise a mixture of a cross-linkable polymer, α,α'-bis(tert-butylperoxy) diisopropylbenzene and a nonionic compound having a hydrophobic group bonded to a polyethylene glycol chain via an ether linkage, wherein the hydrophobic group includes about 12 or more carbon atoms at least 8 of which are in the form of an alkyl chain, and wherein the polyethylene glycol chain includes about 20 or more ethylene oxide units. In one preferred embodiment of the invention, the nonionic compound is a polyoxyethylene stearyl ether having a polyethylene glycol chain that includes from about 50 to about 150 ethylene oxide units. In another preferred embodiment of the invention, the nonionic compound is a polyoxyethylene dinonylphenyl ether having a polyethylene glycol chain that includes from about 100 to about 200 ethylene oxide units.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Polymeric compositions according to the invention comprise, as a first component, α,α'-bis(tert-butylperoxy) diisopropylbenzene. The meta or para isomers of α,α'-bis(tert-butylperoxy) diisopropylbenzene may be used individually, if desired. More preferably, however, a mixture comprising both the meta and para isomers α,α'-bis(tert-butylperoxy) diisopropylbenzene is used. This peroxide is very effective at crosslinking a variety of saturated and unsaturated hydrocarbon polymers. It is typically used at concentrations of about 0.1% to about 6%, preferably about 0.5% to about 3%, by weight based on the weight of the polymer, the quantity employed being dependent on the ease of crosslinking of the polymer being treated. This peroxide is effective at crosslinking temperatures of about 150° C. to about 200° C., preferably about 170° C. to about 180° C. The time of crosslinking may vary from a few seconds to several hours, depending on the temperature and the polymer employed.

Polymeric compositions according to the invention further comprise, as a second component, a nonionic compound having a hydrophobic group bonded to a polyethylene glycol chain via an ether linkage, wherein the hydrophobic group includes about 12 or more carbon atoms at least 8 of which are in the form of an alkyl chain, and wherein the polyethylene glycol chain includes about 20 or more ethylene oxide units. The hydrophobic group can be linear, such as a stearyl group, or it can be branched or include one or more aromatic rings having one or more pendent alkyl chains containing 8 carbons or more.

Preferred nonionic compounds for use in the invention include polyoxyethylene (100) stearyl ether and polyoxyethylene (150) dinonyphenyl ether, with polyoxyethylene (100) stearyl ether being presently most preferred. Throughout the instant specification and in the appended claims, a number shown in parenthesis following the word "polyoxyethylene"

represents the average number of ethylene oxide units in the polyethylene glycol chain bonded to the hydrophobic group via the ether linkage. The number of ethylene oxide units in the nonionic compound is about 20 or greater, and is preferably from about 50 to about 200.

Without being bound to a particular theory, applicants believe that the nonionic compound present in the polymeric compositions according to the invention effectively suppresses bloom by preventing the polar products from the decomposition of α,α'-bis(tert-butylperoxy) diisopropylbenzene from migrating to the surface of the crosslinked polymeric article. It is believed that the non-polar hydrophobic group makes the nonionic compound very compatible with the bulk of the polymeric composition, thereby retarding the nonionic compound from migrating to the surface of the polymeric article, and that the relatively polar long chain polyethylene glycol chain serve as internal adsorption sites for the relatively polar products from the decomposition products α,α'-bis(tert-butylperoxy) diisopropylbenzene to adhere to (so that the decomposition products stay in the bulk of the polymer and do not migrate to the surface of the crosslinked polymeric article). It is further hypothesized that the polar decomposition products, which are alcohols, form hydrogen bonds with the polyethylene glycol chain on the nonionic compound. Surface washing of the crosslinked polymeric articles that were crosslinked using the method according to the invention exhibit a significantly lower concentration of α,α'-bis(tert-butylperoxy) diisopropylbenzene decomposition products than crosslinked polymeric articles that were crosslinked using α,α'-bis(tert-butylperoxy) diisopropylbenzene alone (i.e., did not contain nonionic compounds). Thus, bloom prevention is accomplished by keeping the α,α'-bis(tert-butylperoxy) diisopropylbenzene decomposition products in the bulk of the polymer, and not by inhibiting crystallization of the decomposition products after they migrate to the surface of the article.

Bloom suppression was not evident when the average number of moles of ethylene oxide units per molecule was less than 20. Accordingly, it is believed that the degree of ethoxylation is important, and should be 20 or greater. Use of propylene oxide units instead of ethylene oxide units provided no beneficial effect on bloom.

The peroxide and nonionic compound mixture may be used neat, as a solution in a suitable solvent, as a blend with a polymer, wax or solubilizing resin, or as a concentrate deposited on an inorganic support, with clay and carbon black being preferred inorganic supports. When an inorganic support is employed, it will typically constitute from about 50% to about 90% by weight, preferably about 50% to about 70% by weight, of the composition. Many of the nonionic compounds that can be used in the polymeric compositions according to the invention are waxy solids at room temperature, and thus can be blended with the peroxide and used as a waxy material. Thus, the invention further provides an agent for crosslinking polymers comprising α,α'-bis(tert-butylperoxy) diisopropylbenzene and a nonionic compound having a hydrophobic group bonded to a polyethylene glycol chain via an ether linkage, wherein the hydrophobic group includes about 12 or more carbon atoms at least 8 of which are in the form of an alkyl chain, and wherein the polyethylene glycol chain includes about 20 or more ethylene oxide units.

The polymeric compositions according to the invention further comprise, as a third component, a cross-linkable polymer. As used in the instant specification and in the appended claims, the term "cross-linkable polymer" refers to any polymer that can be crosslinked by α,α'-bis(tert-butylperoxy) diisopropylbenzene. A non-exhaustive list of such polymers includes, for example, low-density polyethylene, high-density polyethylene, ethylene-propylene copolymer, ethylene-propylene terpolymer rubber, natural rubber, butadiene-styrene rubber, polybutadiene, polyisoprene, polychloroprene, sulfochlorinated polyethylene, chlorinated polyethylene and silicone rubber.

The present invention is particularly suitable for use in polymer compositions containing dark colored dyes or fillers such as carbon black, iron oxide, lead chromate, and organic pigments, because bloom is more apparent on the surface of such dark colored materials, and suppression of bloom is therefore very desirable. The presence of the nonionic compound in compositions does not adversely affect the ability of the peroxide to crosslink polymers, and does not interfere with or render incompatible other additives typically present in polymeric compositions.

The present invention thus provides a method of suppressing the formation of bloom on a surface of a crosslinked polymeric article. The method comprises: (1) providing a polymeric composition comprising a mixture of a cross-linkable polymer, α,α'-bis(tert-butylperoxy) diisopropylbenzene and a nonionic compound having a hydrophobic group bonded to a polyethylene glycol chain via an ether linkage, wherein the hydrophobic group includes about 12 or more carbon atoms at least 8 of which are in the form of an alkyl chain, and wherein the polyethylene glycol chain includes about 20 or more ethylene oxide units; and (2) heating the polymeric composition at a temperature sufficient to decompose the α,α'-bis(tert-butylperoxy) diisopropylbenzene to form free radicals that crosslink the polymeric composition. The present invention also provides a crosslinked article formed according to the method. Crosslinked articles formed according to the method of the invention differ from conventional crosslinked articles in that they do not exhibit significant peroxide bloom upon aging and they contain an effective amount of a nonionic compound that suppresses bloom formation.

The following example is intended only to illustrate the invention and should not be construed as imposing limitations upon the claims.

EXAMPLE

Polymeric Compositions A, B, C, D, E, F, G and H were prepared by first forming a masterbatch of EPDM, carbon black, zinc oxide and poly(1,2-dihydro-2,2,4-trimethylquinoline), which were blended in a Banbury mixer to in the amounts shown in Table 1 below (Note: except for the EPDM, all other components are listed in parts per hundred ("phr") relative to the EPDM). No heat was put into the Banbury mixer, but heat did build up in the system due to friction consequent to the kneading of the viscous blend. After a few minutes, the hot, viscous blend was "dropped" into a pan and transferred to a two-roll mill. 8 phr of α,α'-bis(tert-butylperoxy) diisopropylbenzene powder and, in Polymeric Compositions B through H, 2.5 phr of a nonionic surfactant identified in Table 1 below were independently slowly added to the masterbatch over the course of about two minutes each (Polymeric Composition A constituted a Control). In each case, the resulting polymeric (rubber) compound was mixed on the two-roll mill for about 10 minutes or so until complete mixing (homogeneity) was obtained. The amount of α,α'-bis(tert-butylperoxy) diisopropylbenzene present in the Polymeric Compositions was significantly greater than is customarily used in the industry to vulcanize EPDM, but was chosen because it would yield a higher concentration of decomposition products and thus provide a rigorous test of the effectiveness of the nonionic compounds as anti-bloom candidates.

TABLE 1

| Component | A | B | C | D | E | F | G | H |
|---|---|---|---|---|---|---|---|---|
| EPDM [1] | 100 | 100 | 100 | 100 | 100 | 100 | 100 | 100 |
| Carbon Black [2] | 50 | 50 | 50 | 50 | 50 | 50 | 50 | 50 |
| Zinc Oxide [3] | 5 | 5 | 5 | 5 | 5 | 5 | 5 | 5 |
| Poly(1,2-dihydro-2,2,4-trimethylquinoline) [4] | 1 | 1 | 1 | 1 | 1 | 1 | 1 | 1 |
| Vul-Cup 40KE [5] | 8 | 8 | 8 | 8 | 8 | 8 | 8 | 8 |
| Polyoxyethylene (20) Stearyl Ether [6] | — | 2.5 | — | — | — | — | — | — |
| Polyoxyethylene (2) Cetyl Ether [7] | — | — | 2.5 | — | — | — | — | — |
| Polyoxyethylene (100) Stearyl Ether [8] | — | — | — | 2.5 | — | — | — | — |
| Polyoxyethylene (150) Dinonylphenyl Ether [9] | — | — | — | — | 2.5 | — | — | — |
| Polyoxyethylene (2) Nonylphenyl Ether [10] | — | — | — | — | — | 2.5 | — | — |
| Polyoxyethylene (12) Nonylphenyl Ether [11] | — | — | — | — | — | — | 2.5 | — |
| Polyoxyethylene (100) Nonylphenyl Ether [12] | — | — | — | — | — | — | — | 2.5 |

[1] KELTAN 512X50, available from DSM Elastomers;
[2] HAF N330 carbon black, available from Degussa Engineered Carbons;
[3] Kadox 911, available from Zinc Corporation of America;
[4] AGERITE Resin D, available from R. T. Vanderbilt Company, Inc.;
[5] Vul-Cup 40KE, available from GEO Specialty Chemicals;
[6] BRIJ 78, available from Acros Organics;
[7] BRIJ 52, available from Acros Organics;
[8] BRIJ 700, available from Acros Organics;
[9] IGEPAL DM-970, available from Rhodia, Inc.;
[10] IGEPAL CO-210, available from Rhodia, Inc.;
[11] IGEPAL CO-720, available from Rhodia, Inc.;
[12] IGEPAL CO-990, available from Rhodia, Inc.

Samples of the Polymeric Compositions were tested in an oscillating disc rheometer ("ODR") to determine whether any of the nonionic compounds adversely affected the ability of the peroxide to crosslink the polymer, which would manifest as a decrease in the delta torque (a measure of final crosslink density). The ODR test data is reported in Table 2 below.

TABLE 2

| ODR Data | 2A | 2B | 2C | 2D | 2E | 2F | 2G | 2H |
|---|---|---|---|---|---|---|---|---|
| Minimum Torque (lb-in) | 14.4 | 12.3 | 12.8 | 13.5 | 13.7 | 13.5 | 12.4 | 13.9 |
| Maximum Torque (lb-in) | 64.2 | 53.1 | 58.9 | 62 | 63.9 | 61.1 | 53.8 | 64.1 |
| Delta Torque (lb-in) | 49.8 | 40.8 | 46.1 | 48.5 | 50.2 | 47.6 | 41.4 | 50.2 |
| Ts2 (min) [1] | 1.25 | 1.22 | 1.2 | 1.17 | 1.2 | 1.2 | 1.2 | 1.2 |
| T90 (min) [2] | 10.4 | 8.4 | 9.7 | 9.9 | 10.7 | 9.7 | 8.3 | 11 |

[1] Ts2 is a measure of the onset of cross-linking. It is defined as the time (in minutes) required for a rise of 2 lb-in over the minimum ODR torque;
[2] T90 is a measure of overall cure time. It is defined as the time (in minutes) required to reach 90% of the maximum ODR torque.

For most of the Polymeric Compositions, there was no appreciable evidence that the nonionic compounds had any significant adverse affect on the ability of the peroxide to crosslink the polymer. Only Polymeric Compositions 2B and 2G showed a delta torque drop that was greater than one would expect to be within experimental error.

Additional samples of the Polymeric Compositions were separately press cured into test plaques by putting a slab of the uncured final polymeric (rubber) compound in a mold and then pressing the mold between heated platens. The temperature was transferred from the platens through the mold to the polymeric (rubber) compound. The temperature used to cure the plaques was 350° F., and the time allowed for cure was 10 minutes. The cured test plaques were then curled and stored within a section of 2" PVC pipe that was open on both ends and stored in room temperature (~22.5° C.) conditions for four weeks. The PVC pipes were used to avoid handling the test plaques, which could affect blooming. After four weeks, the test plaques were removed from the PVC pipes and observations were made concerning the extent of bloom on the surface. The results of the bloom testing are reported in Table 3 below.

TABLE 3

| Test Sample | Bloom |
|---|---|
| Polymeric Composition A | Heavy |
| Polymeric Composition B | Mild |
| Polymeric Composition C | Heavy |
| Polymeric Composition D | Little/None |
| Polymeric Composition E | Little/None |
| Polymeric Composition F | Heavy |
| Polymeric Composition G | Mild |
| Polymeric Composition H | Heavy |

Little or no bloom could be observed on Polymeric Compositions D and E, which included a mixture of the meta and para isomers of α,α'-bis(tert-butylperoxy) diisopropylbenzene and polyoxyethylene (100) stearyl ether and polyoxyethylene (150) dinonylphenyl ether, respectively.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:
1. A polymeric composition comprising a mixture of:
a cross-linkable polymer;
α,α'-bis(tert-butylperoxy) diisopropylbenzene; and
a nonionic compound having a hydrophobic group bonded to a polyethylene glycol chain via an ether linkage, wherein the hydrophobic group includes about 12 or more carbon atoms at least 8 of which are in the form of an alkyl chain, and wherein the polyethylene glycol chain includes about 20 or more ethylene oxide units.

2. The polymeric composition according to claim 1 wherein the weight ratio of the α,α'-bis(tert-butylperoxy) diisopropylbenzene to the nonionic compound is from about 0.1:1 to about 10:1.

3. The polymeric composition according to claim 1 wherein the weight ratio of the α,α'-bis(tert-butylperoxy) diisopropylbenzene to the nonionic compound is from about 0.5:1 to about 2:1.

4. The polymeric composition according to claim 1 wherein the nonionic compound is a polyoxyethylene stearyl ether.

5. The polymeric composition according to claim 4 wherein the polyethylene glycol chain includes from about 50 to about 150 ethylene oxide units.

6. The polymeric composition according to claim 4 wherein the polyethylene glycol chain includes about 100 ethylene oxide units.

7. The polymeric composition according to claim 1 wherein the nonionic compound is a polyoxyethylene dinonylphenyl ether.

8. The polymeric composition according to claim 7 wherein the polyethylene glycol chain includes from about 100 to about 200 ethylene oxide units.

9. The polymeric composition according to claim 7 wherein the polyethylene glycol chain includes about 150 ethylene oxide units.

10. A method of suppressing the formation of bloom on a surface of a crosslinked polymeric article, the method comprising:

providing a polymeric composition comprising a mixture of:
a cross-linkable polymer;
α,α'-bis(tert-butylperoxy) diisopropylbenzene; and
a nonionic compound having a hydrophobic group bonded to a polyethylene glycol chain via an ether linkage, wherein the hydrophobic group includes about 12 or more carbon atoms at least 8 of which are in the form of an alkyl chain, and wherein the polyethylene glycol chain includes about 20 or more ethylene oxide units; and heating the polymeric composition at a temperature sufficient to decompose the α,α'-bis(tert-butylperoxy) diisopropylbenzene to form free radicals that crosslink the polymeric composition.

11. The method according to claim 10 wherein the weight ratio of the α,α'-bis(tert-butylperoxy) diisopropylbenzene to the nonionic compound is from about 0.1:1 to about 10:1.

12. The method according to claim 10 wherein the weight ratio of the α,α'-bis(tert-butylperoxy) diisopropylbenzene to the nonionic compound is from about 0.5:1 to about 2:1.

13. The method according to claim 10 wherein the nonionic compound is a polyoxyethylene stearyl ether.

14. The method according to claim 13 wherein the polyethylene glycol chain includes from about 50 to about 150 ethylene oxide units.

15. The method according to claim 13 wherein the polyethylene glycol chain includes about 100 ethylene oxide units.

16. The method according to claim 10 wherein the nonionic compound is a polyoxyethylene dinonylphenyl ether.

17. The method according to claim 16 wherein the polyethylene glycol chain includes from about 100 to about 200 ethylene oxide units.

18. The method according to claim 16 wherein the polyethylene glycol chain includes about 150 ethylene oxide units.

19. The method according to claim 10, wherein the polymeric article comprises at least one polymer selected from the group consisting of low-density polyethylene, high-density polyethylene, ethylene-propylene copolymer, ethylene-propylene terpolymer rubber, natural rubber, butadiene-styrene rubber, polybutadiene, polyisoprene, polychloroprene, sulfochlorinated polyethylene, chlorinated polyethylene and silicone rubber.

20. A crosslinked polymeric article formed according to the method of claim 10.

21. An agent for crosslinking polymers comprising α,α'-bis(tert-butylperoxy) diisopropylbenzene and a nonionic compound having a hydrophobic group bonded to a polyethylene glycol chain via an ether linkage, wherein the hydrophobic group includes about 12 or more carbon atoms at least 8 of which are in the form of an alkyl chain, and wherein the polyethylene glycol chain includes about 20 or more ethylene oxide units.

* * * * *